United States Patent [19]
Binversie et al.

[11] Patent Number: 5,632,241
[45] Date of Patent: May 27, 1997

[54] OIL LUBRICATING SYSTEM FOR A TWO-STROKE INTERNAL COMBUSTION ENGINE

[75] Inventors: Gregory J. Binversie, Grayslake; Todd D. Craft, Lake Villa, both of Ill.; Jerry A. Hladilek, Kenosha; Erik Jorgensen, Burlington, both of Wis.

[73] Assignee: Outboard Marine Corporation, Waukegan, Ill.

[21] Appl. No.: 507,051

[22] Filed: Jul. 25, 1995

[51] Int. Cl.$^6$ .......................................... F01M 1/00
[52] U.S. Cl. ........................ 123/196 W; 123/195 HL
[58] Field of Search .................... 123/196 R, 196 W, 123/73 AD, 195 HL, 195 P; 184/6.5, 6.6

[56] References Cited

U.S. PATENT DOCUMENTS

| | | | |
|---|---|---|---|
| 2,459,594 | 1/1949 | Smith | 123/196 W |
| 4,599,979 | 7/1986 | Breckenfeld et al. | 123/196 W |
| 4,926,814 | 5/1990 | Bonde | 123/196 W |
| 5,163,394 | 11/1992 | Koishikawa et al. | 123/196 W |
| 5,193,500 | 3/1993 | Haft | 123/196 |
| 5,215,164 | 6/1993 | Shibata | 184/6.13 |
| 5,287,833 | 2/1994 | Yashiro | 123/196 |
| 5,297,511 | 3/1994 | Suzuki | 123/196 |

FOREIGN PATENT DOCUMENTS

| | | |
|---|---|---|
| 0381162 | 8/1990 | European Pat. Off. |
| 0508486 | 10/1992 | European Pat. Off. |
| 0543423 | 5/1993 | European Pat. Off. |
| 0555827 | 8/1993 | European Pat. Off. |
| 0041415 | 6/1984 | Japan |
| 4272415 | 9/1992 | Japan |
| 4292512 | 10/1992 | Japan |

*Primary Examiner*—David A. Okonsky
*Attorney, Agent, or Firm*—Michael, Best & Friedrich

[57] ABSTRACT

A lubricant supply system for a two-stroke internal combustion engine, which system includes first and second adjacently located and substantially sealed crankcase chambers which alternately experience high and low pressure conditions which are out of phase with respect to the occurrence thereof, first and second oil supply passages respectively communicating with the first and second crankcase chambers, an oil supply circuit including an oil supply chamber adapted to contain oil and having therein a formation including therein a recess isolated from the oil supply chamber and communicating with the first and second oil supply passages, a metering rod including therein an indentation and supported in the oil supply chamber for movement in the formation between a first position wherein the indentation is located in the oil chamber, thereby affording filling of the indentation with oil, and a second position wherein the indentation is located in the formation in communication with the recess, thereby affording supplying of the oil in the indentation to the sealed crankcase chambers, and a mechanism for effecting movement of the oil metering rod between the first and second positions.

29 Claims, 6 Drawing Sheets

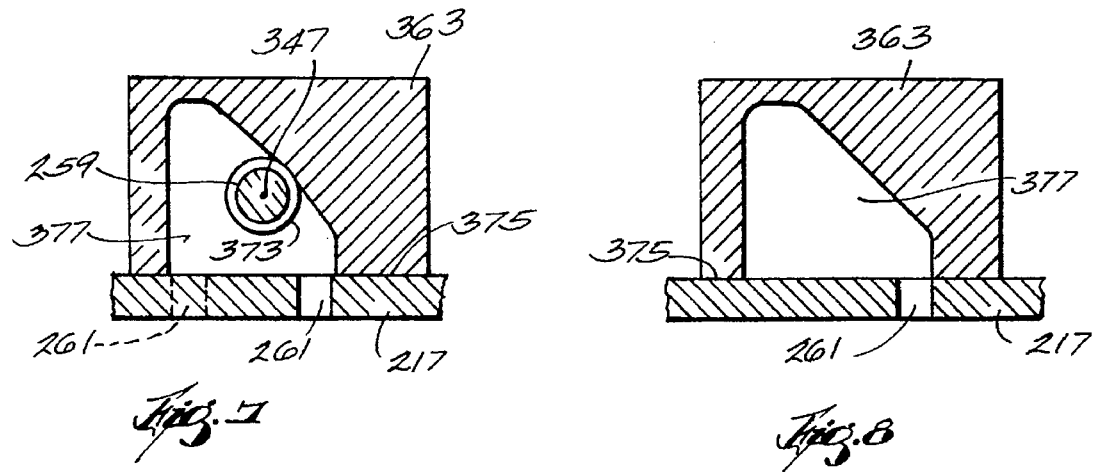
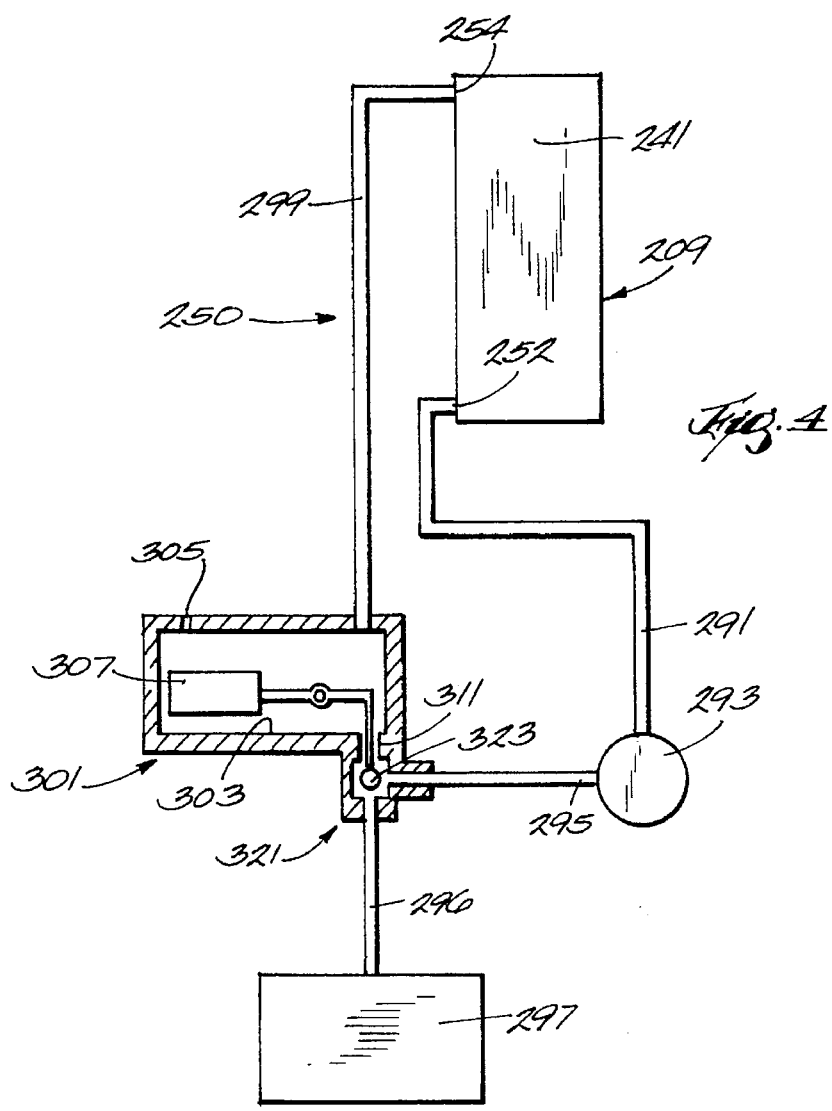

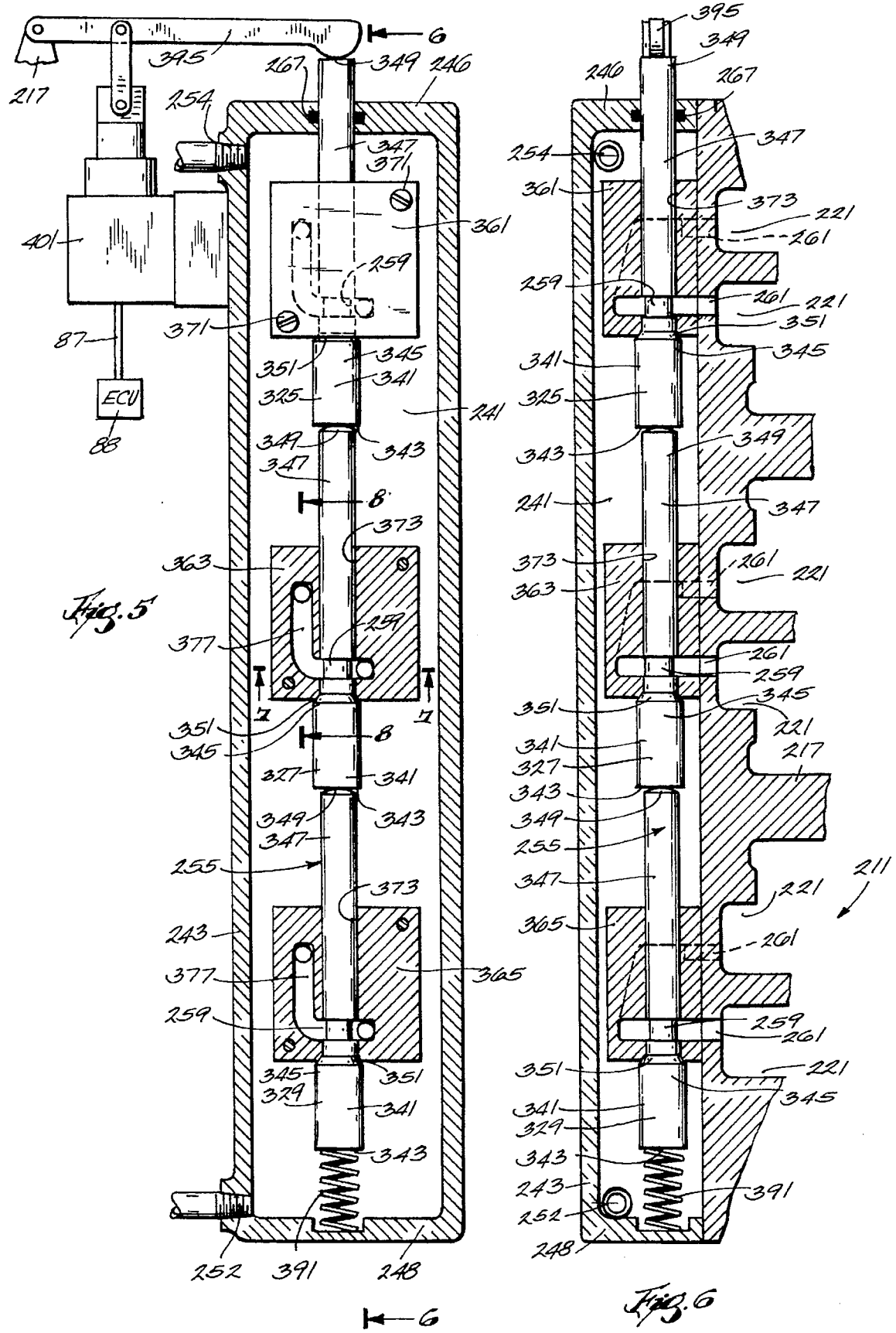

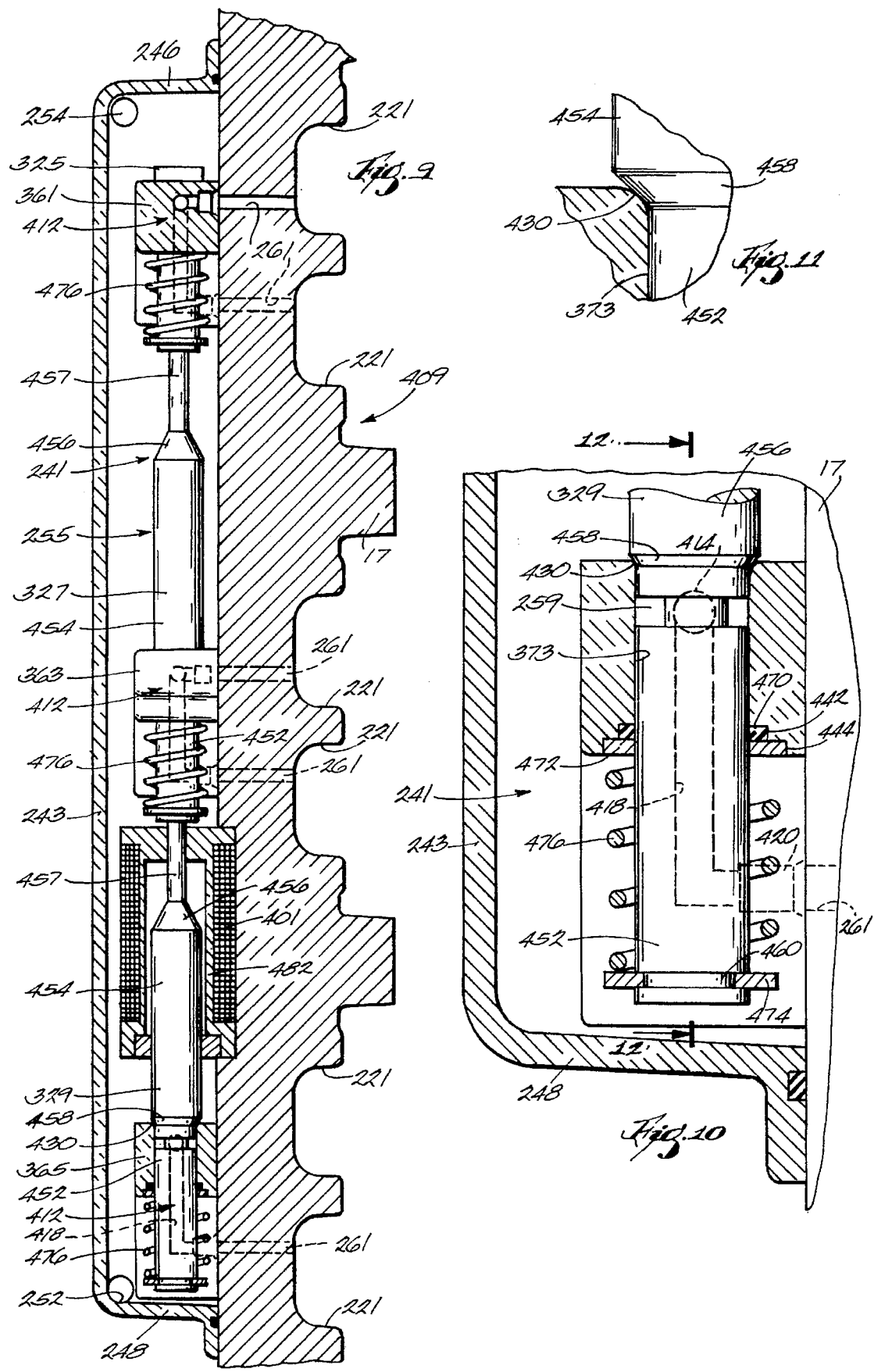

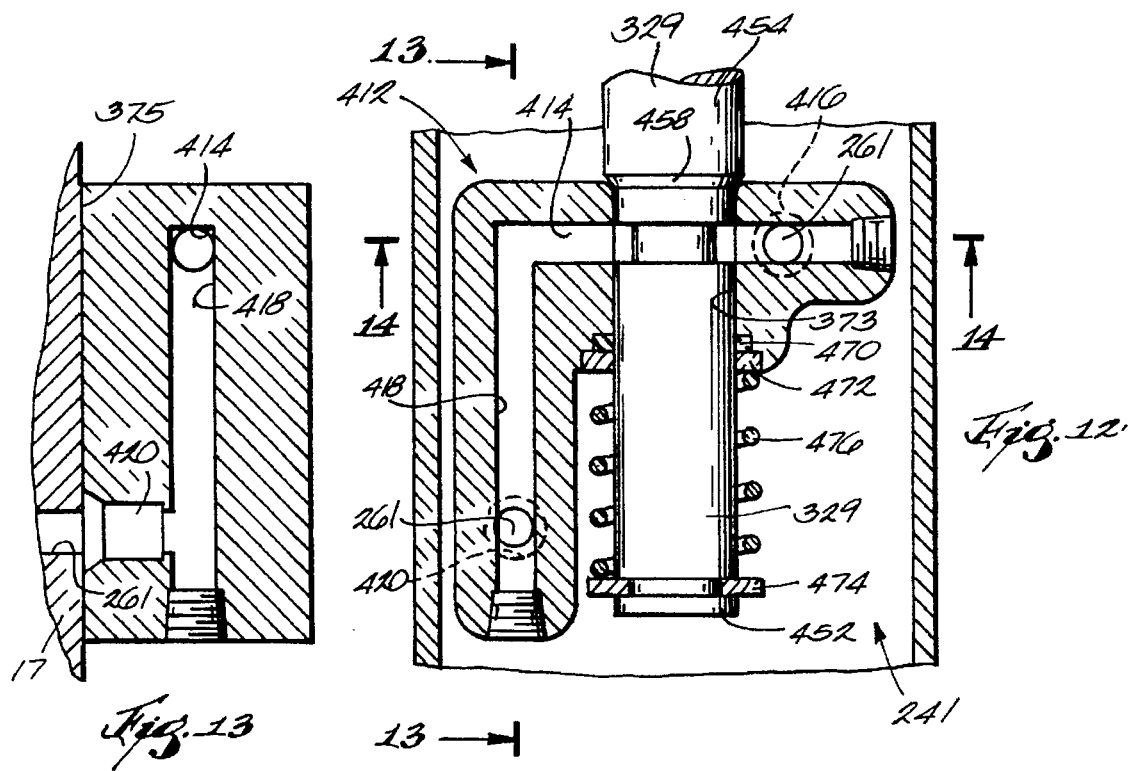
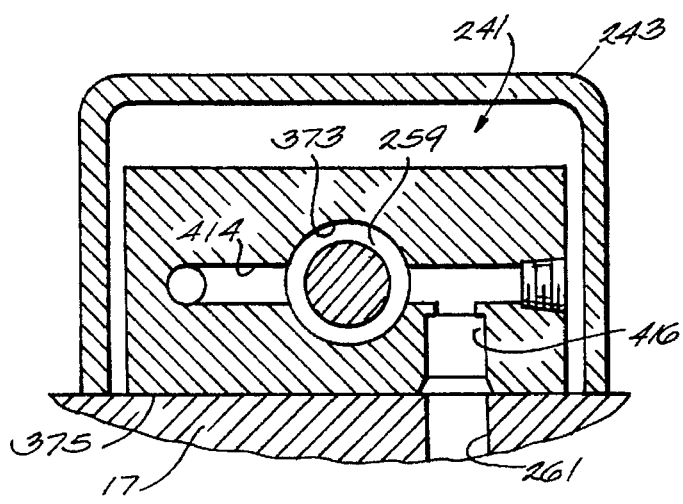

OIL LUBRICATING SYSTEM FOR A TWO-STROKE INTERNAL COMBUSTION ENGINE

BACKGROUND OF THE INVENTION

The invention relates generally to two-stroke internal combustion engines and, more particularly, to lubricating systems therefor.

Attention is directed to U.S. Pat. Nos. 5,193,500; 5,287, 833; and 5,297,511.

Attention is also directed to U.S. application Ser. No. 098,418 filed Jul.27, 1993.

Attention is directed to the following foreign patents:
EP 0543423
EP 0508486
EP 0555827
EP 0381162
JP 0041415
JP 4272415
JP 4292512

SUMMARY OF THE INVENTION

The invention provides a lubricant supply system for a two-stroke internal combustion engine, the system including first and second adjacently located and substantially sealed crankcase chambers which alternately experience high and low pressure conditions which are out of phase with respect to the occurrence thereof, and an oil supply circuit including an oil supply passage including ends respectively communicating with the first and second crankcase chambers, an oil pump, an oil supply chamber adapted to contain oil, communicable with the oil pump for receipt of oil therefrom and communicable with the oil supply passage intermediate the ends for delivery of oil thereto so as to supply the oil to the first and second crankcase chambers, a member moveable independently of the pump and selectively and cyclically in and relative to the oil chamber for delivering a predetermined amount of oil to the supply passage during each cycle of the member, and means for selectively effecting cyclical movement of the member.

The invention also provides a lubricant supply system for a two-stroke internal combustion engine, which system includes first and second adjacently located and substantially sealed crankcase chambers which alternately experience high and low pressure conditions which are out of phase with respect to the occurrence thereof, first and second oil supply passages respectively communicating with the first and second crankcase chambers, an oil supply circuit including an oil supply chamber adapted to contain oil and having therein a formation including therein a recess isolated from the oil supply chamber and communicating with the first and second oil supply passages, a metering rod including therein an indentation and supported in the oil supply chamber for movement in the formation between a first position wherein the indentation is located in the oil chamber, thereby affording filling of the indentation with oil, and a second position wherein the indentation is located in the formation in communication with the recess, thereby affording supplying of the oil in the indentation to the sealed crankcase chambers, and means for effecting movement of the oil metering rod between the first and second positions.

The invention also provides a lubricant supply system for a two-stroke internal combustion engine, which system includes a plurality of pairs of first and second adjacently located and substantially sealed crankcase chambers which extend vertically, which are defined, in part, by a crankcase cover including an exterior wall, and which alternately experience high and low pressure conditions which are out of phase with respect to the occurrence thereof, a like plurality of pairs of first and second oil supply passages respectively communicating with the pairs of first and second crankcase chambers and extending to the wall, an oil supply circuit including an oil supply chamber which is defined by the crankcase cover wall and by a member fixed to the crankcase cover, which extends vertically and includes a top and a bottom, which is adapted to contain oil, and which has therein a like plurality of formations fixed to the wall and respectively including therein vertically extending and aligned apertures, and recesses which respectively communicate with the apertures and face the wall, which are isolated from the oil supply chamber, and which respectively communicate with the pairs of first and second oil supply passages, an oil reservoir, an oil pump communicating with the bottom of the supply chamber to supply oil thereto, a vapor separator communicating with the top of the oil supply chamber to receive returning oil therefrom and including an oil holding tank having therein a float member, and an apportioning valve communicating with the oil reservoir, with the oil holding tank of the vapor separator, and with the oil pump, and including a valve member operatively connected to the float member and being moveable, in response to location of the float member above a given position, to a first position blocking oil flow from the oil reservoir to the oil pump and permitting oil flow from the oil holding tank to the oil pump, and being moveable, in response to location of the float member below a given position, to a second position blocking oil flow from the oil holding tank to the oil pump and permitting oil flow from the oil reservoir to the oil pump, a metering rod including a like plurality of aligned segments which are arranged in series, which respectively include therein grooves, and which are supported in the oil supply chamber for movement in the apertures in the formations between first positions wherein the grooves are located in the oil chamber, thereby affording filling of the grooves with oil, and second positions wherein the grooves are located in the formations in communication with the recesses, thereby affording supplying of the oil in the grooves to the sealed crankcase chambers, an electrical solenoid operative, when energized, to displace the metering rod in one direction between the first and second positions, and a spring operative, when the solenoid is deenergized, to displace the metering rod in the direction opposite to the one direction.

The invention also provides a two-stroke internal combustion engine comprising a first crankcase, a second crankcase, a pulse passage communicating between the first and second crankcases, an oil pump including an inlet and an outlet, an oil supply chamber spaced from the pulse passage, communicating between the oil pump outlet and the oil pump inlet for continuously receiving oil discharged from the oil pump outlet and for continuously returning excess oil to the oil pump inlet, a metering passage extending between the oil supply chamber and the pulse passage, a metering rod extending into the metering passage, including therein a recess, and being movable between an oil receiving position wherein the recess is in communication with the oil supply chamber, whereby a quantity of oil is received in the recess, and a delivery position wherein the recess communicates with the pulse passage, whereby the oil in the recess is delivered to the pulse passage, and means for displacing the metering rod between the receiving position and the delivery position.

The invention also provides an internal combustion engine comprising a crankcase which supports a vertically extending crankshaft, and which defines a pair of adjacent sealed crankcase chambers defined, at least in part, by a crankcase cover including a vertically extending oil supply channel, a pair of bosses located in the oil supply channel in vertically spaced relation to each other and respectively including therein vertically aligned apertures, a pair of horizontally extending oil supply passages communicating with each other, communicating respectively with the pair of crankcases, and respectively intersecting the pair of apertures, a metering rod extending through the apertures in the bosses, being axially moveable between an oil accepting position and an oil delivery position, and including therein a pair of axially spaced annular grooves located in the oil supply channel when the metering rod is in the oil accepting position and respectively located in the oil supply passages when the metering rod is in the oil delivery position, means for displacing the metering rod between the accepting position and the delivery position and including a spring biasing the metering rod in one direction toward one of the accepting position and the delivery position, and a solenoid displacing the metering rod in the direction opposite to the one direction against the action of the spring and to the other of the accepting position and the delivery position in response to electrical actuation thereof, an oil sump, an oil pump including an inlet communicating with the oil sump, and an outlet communicating with the oil supply channel, and a conduit communicating with the oil supply channel and with the pump upstream of the inlet.

The invention also provides a lubricant supply system for a two-stroke internal combustion engine, which system includes a pair of first and second adjacently located and substantially sealed crankcase chambers which alternately experience high and low pressure conditions which are out of phase with respect to the occurrence thereof, and an oil supply circuit including an oil supply passage including ends respectively communicating with the first and second crankcase chambers, an oil pump, an oil supply chamber adapted to contain oil, communicable with the oil pump for receipt of oil therefrom and communicable with the oil supply passage intermediate the ends for delivery of oil thereto so as to supply the oil to the first and second crankcase chambers, a member which includes an oil supply space and which is moveable independently of the pump and selectively and cyclically in and relative to the oil chamber and the oil supply passage between a first position wherein the first and second crankcase chambers are substantially sealed from each other, and a second position wherein the crankcase chambers are in communication with each other, and means for selectively effecting cyclical movement of the member between the first and second positions.

The invention also provides a lubricant supply system for a two-stroke internal combustion engine, which system includes first and second adjacently located and substantially sealed crankcase chambers which alternately experience high and low pressure conditions which are out of phase with respect to the occurrence thereof, and an oil supply circuit including an oil supply passage including ends respectively communicating with the first and second crankcase chambers, an oil pump, an oil supply chamber adapted to contain oil, a member which includes an oil supply space and which is moveable independently of the pump and selectively and cyclically in and relative to the oil chamber and the oil supply passage between a first position wherein the first and second crankcase chambers are substantially sealed from each other and the oil supply space is located in the oil rail, whereby the space is filled with a predetermined amount of oil, and a second position wherein the crankcase chambers are in communication with each other and the oil space is in communication with the oil supply passage so as to deliver the predetermined amount of oil to the supply passage during each cycle, and means for selectively effecting cyclical movement of the member between the first and second positions.

Other features and advantages of the invention will become apparent to those skilled in the art upon review of the following detailed description, claims and drawings.

DESCRIPTION OF THE DRAWINGS

FIG. 4 is a diagrammatic view of an engine oil supply circuit or lubricant supply system embodying various of the features of the invention.

FIG. 5 an enlarged sectional view of the oil supply chamber included in the oil supply circuit shown in FIG. 4.

FIG. 6 is a sectional view taken along line 6—6 of FIG. 5.

FIG. 7 is a sectional view taken along line 7—7 of FIG. 5.

FIG. 8 is a sectional view taken along line 8—8 of FIG. 5.

FIG. 9 is a fragmentary view, partially in section, of still another embodiment of a oil supply or lubricating system incorporating various of the features of the invention.

FIG. 10 is an enlarged view of a portion of the bottom of FIG. 9.

FIG. 11 is an enlarged view of a portion of the top of FIG. 10.

FIG. 12 is a sectional view taken along line 12—12 of FIG. 10.

FIG. 13 is a sectional view taken along line 13—13 of FIG. 12.

FIG. 14 is a sectional view taken along line 14—14 of FIG. 12.

Figure 1:
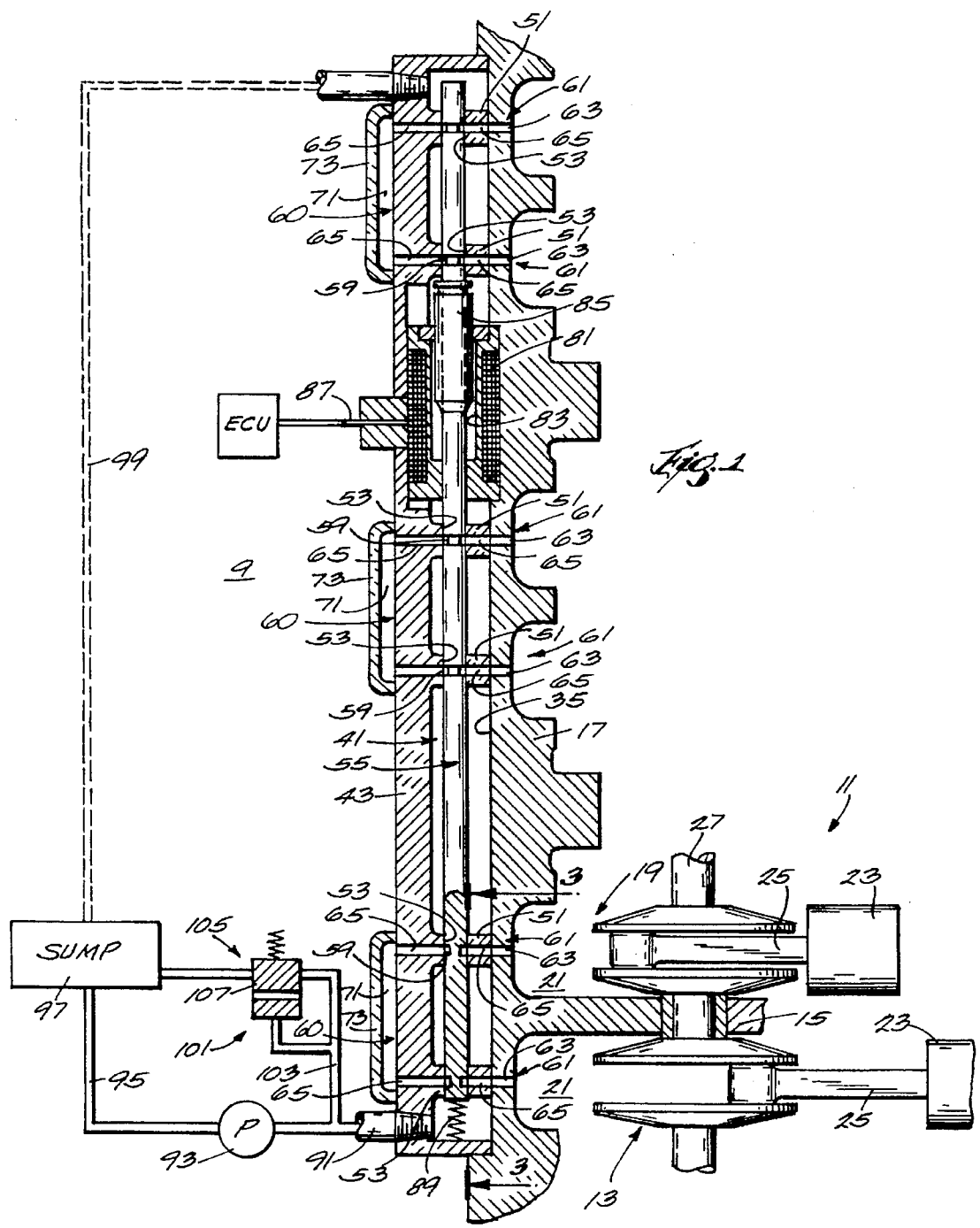
FIG. 1 is a fragmentary view, partially in section, and partially schematic, of a two-stroke internal combustion engine incorporating various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown fragmentarily in FIG. 1 is a two-stroke internal combustion engine 11 including a lubricant supply system or oil supply circuit 9. The two-stroke internal combustion engine 11 comprises an engine block assembly 13 including a cylinder block 15 and a crankcase cover 17 which, together, define a crankcase 19 including a plurality of substantially sealed crankcase chambers 21 which are arranged so that the alternating high and low pressures in each pair of adjacent crankcase chambers 21 are out of phase. While the disclosed engine 11 includes six cylinders, the invention is applicable to single cylinder engines and to multi-cylinder engines with other than six cylinders.

More particularly, the disclosed engine 11 includes six crankcase chambers 21 (two shown), six cylinders (not shown), and six pistons 23 (two shown) which are respectively connected to connecting rods 25 (two shown) which, in turn, are respectively pivotally connected to crank pins (not shown) respectively located in the six crankcase chambers 21 and respectively forming parts of a vertically extending crankshaft 27 which is suitably journalled in the engine block assembly 13.

The lubricant supply system or oil supply circuit 9 includes means for supplying oil to the crankcase chambers 21. While various other constructions can be employed, in the construction disclosed in FIG. 1, such means includes a vertically extending oil rail recess 35 which is located in the crankcase cover 17 and which partially defines an oil supply line, or duct, or conduit, or oil rail, or oil supply chamber 41. Cooperating with the crankcase cover 17 to complete definition of the oil supply rail 41 is an oil rail cover 43 which extends into the oil rail recess 35 in the crankcase cover 17 and which is suitably fixed to the crankcase cover 17.

The oil supply circuit also includes provision in the oil rail cover recess 35 of a plurality of projections 51 which extend into the oil supply rail 41 (without interfering with oil flow therein), which are vertically spaced from one another in accordance with the vertical spacing of the crankcase chambers 21, and which respectively include vertically aligned apertures 53. In the illustrated construction, the projections 51 are part of the oil rail cover 43.

The oil supply circuit also includes a member moveable independently of a supply pump (still to be described) and selectively and cyclically in and relative to the oil rail or chamber 41 for delivering a predetermined amount of oil to an oil supply passage or duct (still to be described) during each cycle. While various members can be employed, such as a piston member or other member, in the disclosed construction, the member comprises an elongated oil metering member or rod 55 which is received in the apertures 53 in the blocks 51, which is axially linearly reciprocable in the oil supply rail 41, and which includes a cylindrical outer surface having therein a plurality of indentations or oil supply spaces which can take various forms, such as a diametric hole. In the disclosed construction, such indentations are in the form of annular grooves 59 which are located in the outer cylindrical surface, which are adapted to contain a predetermined amount of oil, and which are spaced from one another at the same spacing as the projections 51.

The oil supply circuit also includes, for each pair of adjacent crankcase chambers 21, an oil supply duct or oil supply passage 60 which includes, for each crankcase chamber 21, a branch passage or duct 61. Each branch passage 61 includes a crankcase cover duct portion 63 extending in the crankcase cover 17 and communicating with one of the pair of adjacent crankcase chambers 21, and an oil rail cover portion 65 which is located in one of an associated pair of the projections 51 and communicates, at one end, with the adjacent crankcase cover duct portion 63, and communicates, at an intermediate part thereof, with the aperture 53 in the associated one of the pair of the projections 51. At the other end thereof, the oil rail cover portions 65 of each oil supply duct 61 communicate with an oil passage 71 which is part of the oil supply duct or passage 60, which is formed by a cover 73 fixed to the oil rail cover 43 and which communicates with the oil rail cover portions 65 of the branch oil supply ducts 61 associated with the adjacent pair of crankcase chambers 21.

The oil supply circuit also includes means for selectively effecting cyclical movement of the oil delivery member (which in the disclosed construction, is in the form of the oil metering rod 55) to supply oil from the oil supply rail or supply chamber 41 to the crankcase chambers 21. While other suitable constructions can be employed, in the disclosed construction, such means includes a solenoid coil 81 which is located in an enlarged portion of the oil supply rail 41 (without interfering with oil flow therein), which includes an axial bore 83 through which the oil metering rod 55 passes, and which operates to attract an armature 85 fixed to the oil metering rod 55 and thereby to downwardly displace, as shown in FIG. 1, the oil metering rod 55 to a lower position wherein the grooves 59 are displaced from the apertures 53 in the projections 51 and located in the oil contained in the oil rail 41 so as thereby to fill the grooves 59 with oil.

The means for selectively effecting cyclical movement of the oil delivery member also includes a electronic control unit 88 which is connected to the solenoid 81 by one or more leads 87 so as to effect actuation of the solenoid to displace the metering rod downwardly to pick-up another predetermined amount of oil. The solenoid coil 81 is energized periodically by the electronic control unit 88 to supply the crankcase chambers 21 with a desired amount of lubricating oil in accordance with one or more engine operating conditions.

The means for selectively effecting cyclical movement of the oil delivery member also includes means for biasing the oil metering rod 55 in the upward direction (as shown in FIG. 1} and to an upper position wherein the annular indentations or grooves 59 are located in the apertures 53 in the projections 51 and in communication with the branch oil supply ducts 61. While other constructions can be employed, in the disclosed construction, such biasing means comprises a spring 89 located between the lower end of the metering rod 55 and the bottom of the oil rail recess 35. Accordingly, the metering rod 55 can be repetitively cycled, i.e., linearly reciprocated, at a desired frequency to obtain a desired rate of oil supply.

The oil supply circuit also includes means for supplying oil under pressure to the oil supply chamber or rail 41 and for returning excess oil. While other constructions can be employed, in the disclosed construction, such means includes communication of the lower end of the oil supply rail 41 with a an oil supply conduit or duct 91 leading to an oil pump 93 which can be of any suitable construction for supplying oil under low pressure and which, in turn, communicates through another supply conduit or duct 95 with an oil reservoir or oil sump 97. At the upper end thereof, the oil supply rail 41 communicates through a return conduit or duct 99 with the oil reservoir or sump 97. If desired, the return conduit or duct 99 could communicate directly with the supply conduit 95 leading from the oil reservoir or sump 97 to the oil pump 93.

Extending in by-passing relation to the oil pump 93 is a pressure regulating arrangement 101 which includes a conduit or duct 103 communicating between the oil supply conduit 91 and the oil return conduit 99 and which includes a pressure operated valve 105 having a valve member 107 subject to the pressure in the supply conduit or duct 91. Accordingly, the oil in the supply rail 41 is retained under a constant pressure.

In operation, as just pointed out, the oil pump 93 supplies oil to the oil supply rail 41 under constant pressure and in an amount in excess of the oil delivered from the oil supply rail 41. Consequently, the oil supply rail 41 is constantly filled with oil under pressure. Upon actuation of the solenoid coil 81 to lower the metering rod 51, the annual grooves 59 communicate with the oil in the oil supply rail 41 and fill with oil. Upon deenergization of the solenoid coil 81, the spring 89 serves to again return the oil metering rod 51 to the raised or upper position wherein the annular grooves 59 communicate with and deliver oil to the oil supply ducts 61. As piston movement creates alternate high and low pressure conditions in the sealed crankcase chambers 21, such alternating pressures are applied to the supply ducts 61 to deliver the oil in the annular grooves 59 into the sealed crankcase chambers 21.

Shown in FIGS. 4 through 8 is another lubricant supply system 209 for a two stroke internal combustion engine 211 (see FIG. 6). As in the previously disclosed embodiment, the arrangement is located on a crankcase cover 217 which, in part, includes an inner surface defining a series of sealed crankcase chambers 221 individually associated with respective engine cylinders (not shown). While other constructions can be employed, in the construction shown in FIGS. 4 through 8, the engine includes upper, central, and lower crankcase chamber pairs, i.e., six substantially sealed crankcase chambers 221 arranged so that the alternating high and low pressures in each pair of adjacent crankcase chambers 221 are out of phase.

The lubricating system 209 includes an oil supply chamber or rail 241 which extends vertically i.e., in generally parallel relation to a crankshaft (not shown), which can be formed in any suitable manner, and which, in the disclosed construction, is formed by (see FIGS. 5 and 6) a recessed cover member 243 which includes upper and lower walls 246 and 248 and which is suitably attached to or on a planar portion of the outer surface of a crankcase cover 217. A suitable gasket (not shown) can be employed between the crankcase cover 217 and the cover member 243 to prevent leakage from the oil supply chamber or rail 241.

The lubricating system 209 also includes (see FIG. 4) an oil supply circuit 250 for supplying oil to the oil supply chamber or rail 241. More particularly, the oil supply circuit 250 supplies oil to the oil supply chamber or rail 241 through a lower port 252 at the bottom of the oil supply chamber 241, and oil is drained from the oil supply chamber 241 through an upper port 254 at the upper end thereof.

The oil supply circuit 250 includes an oil pump 293 communicating with the oil supply port 252 through a supply conduit or duct 291. Any suitable oil pump 293 can be employed. The oil supply circuit 250 also includes an oil supply tank or reservoir 297 communicating with an oil supply conduit or duct 296.

In order to remove any air or vapor which may enter into the oil flowing in the oil supply chamber or oil rail 241, the oil supply circuit 250 also includes a vapor separator 301 which includes a holding tank 303 having, in an upper portion thereof, a suitable air or vapor vent 305 and a movably mounted float 307. The vapor separator holding tank 303 receives, at an upper portion thereof, oil from the drain port 254 through a return conduit 299. Adjacent the bottom thereof, the holding tank 303 of the vapor separator 301 communicates through a port 311 with an apportioning valve 321 which also communicates with the supply conduit or duct 296 leading from the oil supply oil tank or sump or reservoir 207 and with a supply conduit 295 communicating with the oil pump 293.

The apportioning valve 321 includes a valve member or ball 323 which is moveable between a first or upper position wherein the valve member 323 blocks flow from the holding tank 303 to the oil pump 293 through the supply conduit 295, and permits oil flow from the reservoir 297 to the oil pump 293 through the supply conduits 295 and 296, and a second or lower position wherein oil flow from the reservoir 297 to the oil pump 293 is blocked and oil flow from the holding tank 303 to the oil pump 293 is permitted through the conduit 295. The valve member 323 is operatively connected to the float 307 for movement between the first and second positions so as to cause movement of the valve member 323 to the first position when the oil in the holding tank 303 is below a given level and so as to cause movement of the valve member 323 to the second position when the oil level in the holding tank 303 is above the predetermined level. The apportioning valve 321 can be operative to permit simultaneous flow from the reservoir 297 and from the holding tank 303 to the oil pump 293 during movement of the valve member 323 between the first and second positions. Any suitable vapor separator and apportioning valve construction can be employed consistent with the foregoing. Of course, the oil supply circuit 250 shown in FIG. 4 can also be employed in the lubricant supply system shown in FIGS. 1 through 3.

Extending in the oil supply chamber or oil rail 241, (see FIGS. 5 and 6) in parallel relation to the crankshaft (not shown), is an oil metering rod 255 which, while other constructions can be employed, in the disclosed construction, comprises three generally identical segments, i.e., an upper segment 325, a central or middle segment 327, and a lower segment 329. Each of the upper, central, and lower segments 325, 327, and 329 includes a relatively enlarged lower portion 341 having a lower end 343 and an upper end 345. Extending from the upper end 345 of the enlarged lower portion 341 is an upper portion 347 which includes an upper end 349 and which is of generally of uniform diameter except for an indentation which can take various forms, and which, in the disclosed construction, is in the form of an annular groove 259 located adjacent the lower enlarged portion 341. Preferably, a small chamfered portion 351 is located between the lower and upper portions 341 and 347. The upper, central, and lower segments 325, 327, and 329 are arranged in serial relation to each other with the upper end 349 of the lower segment 329 in engagement with the bottom end 343 of the central or middle segment 327, and with the upper end 349 of the central or middle segment 327 segment in engagement with the bottom or lower end 343 of the upper segment 325.

The metering rod 255 is guided for reciprocation by a series of three blocks, or formations, or projections or elements, i.e., an upper block 361, a middle block 363, and a lower block 365, one for each pair of adjacent sealed crankcase chambers 221. Each of the upper, central, and lower blocks 361, 363, and 365 is generally identically constructed and is suitably secured to the crankcase cover 217 as by a pair of screws 371 (FIG. 5) or by pins press fitted into the blocks and into the crankcase cover. The blocks 361, 363, and 365 are suitably dimensioned so as not to impede oil flow therepast from the bottom to the top of the oil supply chamber or oil rail 241. Each of the blocks 361,363, and 365 includes a central bore 373 through which the upper portion 347 of the applicable metering rod segment passes in closely fitting relation to generally prevent oil flow therebetween.

Each of the blocks 361,363, and 365 also includes (see FIGS. 7 and 8) an undersurface 375 in engagement with the crankcase cover 217 and having therein an L-shaped recess 377 which communicates with the central bore 373 and with a pair of axially spaced branch oil supply ducts or passages 261 which are located in the crankcase cover 217, which extend in the direction transverse to the direction of metering rod reciprocation, and which respectively communicate with the two sealed crankcase chambers 221 of an associated pair thereof as can be seen in FIG. 6.

At the lower end thereof, i.e., the lower end 343 of the lower segment 329, the metering rod 255 is biased upwardly by a suitable helical spring 391 (FIGS. 5 and 6) which, at the lower end thereof, bears against the lower wall 248 of the cover member 243 and which, at the upper end thereof, bears against the lower end 343 of the lower segment 329 of the metering rod 255. The upper end 349 of the upper segment 325 of the metering rod 255 extends through the upper wall 246 of the cover member 243 to facilitate downward metering rod movement, against the action of the spring 391, in response to an actuating mechanism, thereby providing reciprocating movement of the metering rod 255 in the oil supply chamber or oil rail 241. Any suitable seal 267 can be provided between the upper segment 325 of the metering rod 255 and the upper wall 246 of the cover member 243 to prevent leakage therebetween.

Any suitable actuating mechanism can be employed. In the disclosed construction, the metering rod 255 is displaced downwardly by rocking movement of one end of a suitable lever 395 which is preferably pivotally mounted on the crankcase cover 217. Connected to the lever 395, intermediate the ends thereof, to cause such rocking movement is a suitable solenoid 401 including a suitable coil (not shown) and a suitable armature (not shown) which is located, at least in part, within the coil and which is suitably connected to the lever 395. In operation, the metering rod 255 is normally biased upwardly by the spring 391 so as to respectively locate the annular grooves 259 in communication with the recesses 377 in the blocks 361, 363, and 365. Energization of the solenoid coil causes the metering rod 255 to be depressed downwardly, thereby locating the annular grooves 259 in the oil supply chamber or oil rail 241 so as thereby to permit oil to occupy the annular grooves 259. When the solenoid coil 403 is deenergized, the spring 391 again upwardly displaces the metering rod 255, thereby again locating the annular grooves 259 in communication with the respective recesses 377 and thereby with the oil supply ducts 261 so as thereby to afford supply of lubricating oil to the sealed crankcase chambers 221 in response to the changing and alternating pressures therein. When the solenoid coil is again energized, the metering rod 255 will again be downwardly depressed to again refill the grooves 259 with lubricating oil.

The disclosed constructions operate to supply a fixed or metered amount of lubricating oil to the sealed crankcase chambers of a two-stroke internal combustion engine in response to each actuation of a solenoid. Upon delivery of the oil to the oil supply passages by reason of displacement of the annular grooves into communication therewith, the oil is swept from the oil metering rod and blown into the crankcase by air flow due to the pressure differential in the adjacent sealed crankcase chambers.

The oil/fuel ratio can be controlled at any given engine speed by the frequency of reciprocation of the metering rod which is controlled by actuation of the solenoid which, in turn, can be driven by the electronic control unit 88 or by a power pack at a frequency determined by anyone of the fuel flow, the throttle position, and the engine speed.

Shown in FIGS. 9 through 14 is another embodiment of an oil supply or lubricating system 409 which is generally identical to the lubricating system 209 shown in FIGS. 4 through 8 except as indicated hereinafter. The same reference numerals as applied to the embodiment shown in FIGS. 4 through 8 are also applicable to similar components of the lubricating system 409.

As in the lubricating system 209, the lubricating system 409 employs a plurality of blocks or elements, i.e., upper, middle and lower blocks or elements 361, 363, and 365, which are suitably mounted on the crankcase cover 17. However, as compared to the blocks employed in the lubricating system 209, the blocks in the lubricating system 409 are L-shaped, instead of being rectangular. In addition, instead of the recess 377 on the undersurface thereof, the blocks in the lubrication system 409 employ (see especially FIG. 12) a conduit system or arrangement 412 including a main conduit 414 which intersects or communicates with the bore or aperture 373 and, in turn, intersects or communicates, on one side of the bore or aperture 373, with a conduit 416 which terminates in the undersurface 375 in position so as to communicate with one of the branch oil supply ducts or passages 261 in the crankcase cover 17. In addition, the conduit system or arrangement 412 includes another conduit 418 which is generally coplanar with the main conduit 414 and which intersects or communicates with the main conduit 414 on the other side of the intersection of the main conduit 414 and the bore or aperture 373. In turn, the conduit 418 intersects or communicates with another conduit 420 which extends to the undersurface 375 in position so as to communicate with the other of the branch oil supply ducts or passages 261 in the crankcase cover 17.

The blocks 361, 363, and 365 are also provided, at the upper end of the respective bores or apertures 373, with a rounded or radiused surface 430 affording sealing engagement with the associated metering rod, and, at the lower ends thereof, the apertures 373 each include (see FIG. 10) first and second counterbores 442 and 444, with the first counterbore 442 have a diameter greater than the diameter of the bore or aperture 373, and with the second counterbore 444 having a diameter greater than the diameter of the first counterbore 442.

As in the lubricating system 209, the lubricating system 409 employs a metering rod 255 which comprises a series of three segments or rods, i.e., an upper metering rod 325, a middle metering rod 327, and a lower metering rod 329, which, together constitute the metering rod 255. The middle and lower metering rods 327 and 329 are generally identically constructed and each includes an upper portion 454 which, in general, remains exterior to the associated bore or aperture 373 and which includes an intermediate sub-portion 456 of frustoconical shape, and an upper end sub-portion 457. Each of the middle and lower metering rods 327 and 329 also includes a lower portion 452 which is connected to the upper portion 454 (see especially FIG. 11) by a connecting portion which includes a chamfered surface 458 and which cooperates with the rounded surface 430 at the upper margin of the associated bore or aperture 373 so as to provide, as will be explained in greater detail hereinafter, sealing engagement therebetween, thereby preventing or at least minimizing leakage into the oil rail 241 of gasses from the sealed crankcase chambers 221. The lower portions 452 also each include (see FIG. 10), in spaced relation to the chamfered surface 458, an upper annular groove 259 which corresponds to the annular grooves 59 and 259 previously described. In addition, adjacent the lower end thereof, the lower portion 452 includes another or lower annular groove 460 adapted to receive a snap ring or other suitable member still to be described.

In the lubricating supply system 409, as in the lubricating system 209, the upper end of the lower metering rod 329 bears against the lower end of the middle metering rod 327, and the upper end of the middle metering rod 327 bears against the lower end of the upper metering rod 325, and, thus, the three metering rods 325, 327, and 329 act in unison to move upwardly in response to actuation of the solenoid still to be described.

The lubricating system 409 also includes means for normally locating the metering rod(s) in their lower position (s), i.e., the position wherein the grooves 259 communicate through the conduit system 412 with the branch oil supply ducts 261 in the crankcase cover 17. While other constructions can be employed, in the disclosed construction, such means also serves to seal the metering rod(s) and the bore(s) or aperture(s) 373 when the metering rod(s) are in the lower positions with the annular grooves 259 communicating with the conduit system 412, thereby preventing or at least minimizing leakage of gas from the substantially sealed crankcase chambers 221 to the oil rail 241. More particularly, in the disclosed construction, such means includes (see FIG. 10), in addition to the rounded surfaces 430 at the upper end of the bores or apertures 373 and the chamfered surfaces 458 between the upper and lower metering rod portions 452 and 454, a suitable sealing member 470 (which can be in the form of an O-ring) located in surrounding relation to the lower metering rod portion 452 and in the first counterbore 442 in the associated block. Axially outwardly of the sealing member 470, the sealing means includes a washer 472 which extends in surrounding relation to the lower metering rod portion 452, which is located in the counterbore 444, and which axially engages the sealing member 470. The sealing means also includes a snap ring or C-clip 474 which is fixed in the lower groove 460. Located between the washer 472 and the snap ring 474 and in surrounding relation to the lower metering rod portion 452 is a suitable spring 476 which can be in the form of a helical spring and which normally urges the associated metering rod downwardly and the associated washer 472 upwardly, thereby downwardly displacing the associated metering rod to locate the annular groove 259 in communication with the associated conduit system 412 so as to enable delivery of oil to 5 the sealed crankcase chambers 221. By pushing the washer 472 upwardly, the spring 476 pushes the seal 470 into sealing engagement with the block and with the metering rod. The spring 476 also serves to sealingly engage the rounded surface 430 with the chamfered surface 458. As a consequence, leakage of gas from the crankcase chambers 221 into the oil rail 241 is prevented or at least minimized.

The upper metering rod 325 is constructed in generally identical fashion to the middle and lower metering rods 327 and 329 except that the upper portion of the upper metering rod 325 is of minimum axial length. In addition, the upper metering rod 325 is sealed to the upper block 361 in the same manner as the sealing between the middle and lower metering rods 327 and 329 and the associated blocks 363 and 365.

Figure 2:
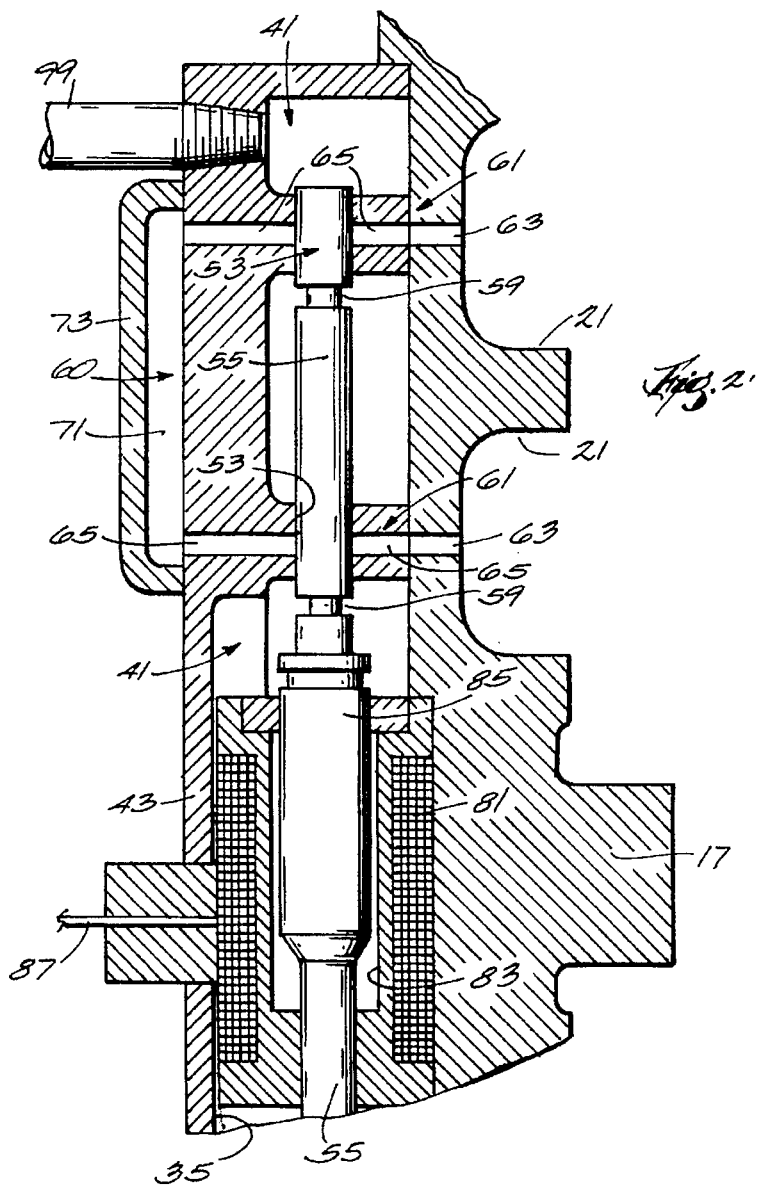
FIG. 2 is an enlarged, fragmentary sectional view of a portion of the two-stroke engine shown in FIG. 1.
Figure 3:
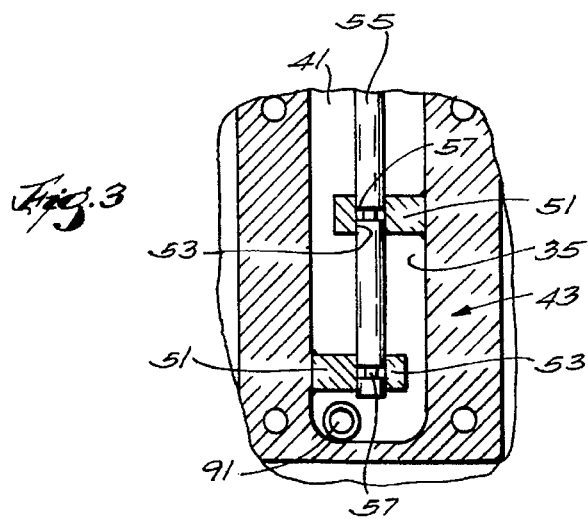
FIG. 3 is an enlarged, fragmentary sectional view, taken along line 3—3 of FIG. 1, of an other portion of the two-stroke engine shown in FIG. 1.

The lubricating system 409 shown in FIGS. 9 through differs from the lubricating system shown in FIGS. 4 through 8, and from the oil supply or lubricating system 9 shown in FIGS. 1 through 3 in that the metering rods are displaced downwardly, against the action of the spring 476, to locate the annular grooves 259 in the oil rail 241 so as to enable filling thereof with oil, by a solenoid 401 which is periodically energized by an electronic control unit 88 to move the upper portion 454, which functions as an armature. The solenoid 401 is located in the oil rail 241, i.e., is submerged in oil to assist in removing heat and in providing lubrication between the upper portion 454 and a guide sleeve 482 located between the solenoid coil and the upper portion 454. The solenoid 401 is configured relative the oil rail 241 so as not to impede oil flow from the bottom to the top thereof.

Preferably, the lower metering rod 329 is fabricated from two pieces, with one of the pieces (corresponding generally to the upper portion 454) being fabricated of ferrous material having a low reluctance, and with the other piece (corresponding generally to the lower portion 452) being fabricated of a material providing good wearing characteristics, such as stainless steel. Any suitable technique can be employed for unitizing the two pieces.

The oil supply or lubrication system 409 also differs from the system 209 in that the upper or top wall 246 of the oil rail cover 243 is not apertured to permit projection therethrough of the metering rod.

The invention is applicable to both carbureted engines and fuel injected two-stroke engines.

Various of the features of the invention are set forth in the following claims.

We claim:

1. A lubricant supply system for a two-stroke internal combustion engine, said system including first and second adjacently located and substantially sealed crankcase chambers which alternately experience high and low pressure conditions which are out of phase with respect to the occurrence thereof, and an oil supply circuit including an oil supply passage including ends respectively communicating with said first and second crankcase chambers, an oil pump, an oil supply chamber adapted to contain oil, communicable with said oil pump for receipt of oil therefrom and communicable with said oil supply passage intermediate said ends for delivery of oil thereto so as to supply the oil to said first and second crankcase chambers, a member moveable independently of said pump and selectively and cyclically in and relative to said oil chamber for delivering a predetermined amount of oil to said supply passage during each cycle of said member, and means for selectively effecting cyclical movement of said member.

2. A lubricant supply system in accordance with claim 1 wherein said means for effecting movement includes a solenoid operative to displace said member in one direction, a spring operative to displace said member in the other direction, and an electronic control unit electrically connected to said solenoid.

3. A lubricant supply system in accordance with claim 1 wherein said member reciprocally moves during each cycle.

4. A lubricant supply system in accordance with claim 1 wherein said member linearly reciprocally moves during each cycle.

5. A lubricant supply system for a two-stroke internal combustion engine, said system including first and second adjacently located and substantially sealed crankcase chambers which alternately experience high and low pressure conditions which are out of phase with respect to the occurrence thereof, first and second oil supply passages respectively communicating with said first and second crankcase chambers, an oil supply circuit including an oil supply chamber adapted to contain oil and having therein a formation including therein a recess isolated from said oil supply chamber and communicating with said first and second oil supply passages, a metering rod including therein an indentation and supported in said oil supply chamber for movement in said formation between a first position wherein said indentation is located in said oil chamber, thereby affording filling of said indentation with oil, and a second position wherein said indentation is located in said formation in communication with said recess, thereby affording supplying of the oil in said indentation to said sealed crankcase chambers, and means for effecting movement of said oil metering rod between said first and second positions.

6. A lubricant supply system in accordance with claim 5 wherein said means for effecting movement of said oil metering rod between said first and second positions includes an electrical solenoid operative, when energized, to displace said metering rod in one direction between said first and second positions.

7. A lubricant supply system in accordance with claim 5 wherein said means for effecting movement of said oil metering rod between said first and second positions includes a spring displacing said metering rod in one direction.

8. A lubricant supply system in accordance with claim 5 wherein said means for effecting movement of said oil metering rod between said first and second positions includes an electrical solenoid operative, when energized, to displace said metering rod in one direction between said first and second positions, and a spring operative, when said solenoid is deenergized, to displace said metering rod in the direction opposite to said one direction.

9. A lubricant supply system in accordance with claim 5 wherein said an oil supply circuit includes means communicating with said oil supply chamber for supplying oil thereto.

10. A lubricant supply system in accordance with claim 5 wherein said means for supplying oil to said oil supply chamber includes an oil reservoir, an oil pump communicating with said oil supply chamber to supply oil thereto, a vapor separator communicating with said oil supply chamber to receive returning oil therefrom and including an oil holding tank having therein a float member, and an apportioning valve communicating with said oil reservoir, with said oil holding tank of said vapor separator, and with said oil pump, and including a valve member operatively connected to said float member and being moveable, in response to location of said float member above a given position, to a first position blocking oil flow from said oil reservoir to said oil pump and permitting oil flow from said oil holding tank to said oil pump, and being moveable, in response to location of said float member below a given position, to a second position blocking oil flow from said oil holding tank to said oil pump and permitting oil flow from said oil reservoir to said oil pump.

11. A lubricant supply system in accordance with claim 5 wherein said oil supply chamber extends vertically and includes a top and a bottom, wherein said vapor separator communicates with said top of said oil supply chamber, and wherein said oil pump communicates with said bottom of said oil supply chamber.

12. A lubricant supply system in accordance with claim 5 wherein said first and second crankcase chambers are defined, in part, by a crankcase cover, and wherein said oil supply chamber includes a wall defined by said crankcase cover, and by a member fixed to said crankcase cover.

13. A lubricant supply system in accordance with claim 12 wherein said oil supply passages extend to said wall, and wherein said formation is located on said wall with said recess facing said wall and in communication with said oil supply passages.

14. A lubricant supply system in accordance with claim 5 wherein said system includes a plurality of said first and second sealed crankcase chambers, a like plurality of said oil supply passages, a like plurality of said formations respectively including said apertures which are in alignment with each other, and said recesses which respectively communicate with said oil supply passages, and wherein said metering rod includes a like plurality of aligned segments which are arranged in series, which respectively extend in said apertures in said formations, and which respectively include said grooves.

15. A lubricant supply system for a two-stroke internal combustion engine, said system including a plurality of pairs of first and second adjacently located and substantially sealed crankcase chambers which extend vertically, which are defined, in part, by a crankcase cover including an exterior wall, and which alternately experience high and low pressure conditions which are out of phase with respect to the occurrence thereof, a like plurality of pairs of first and second oil supply passages respectively communicating with said pairs of first and second crankcase chambers and extending to said wall, an oil supply circuit including an oil supply chamber which is defined by said crankcase cover wall and by a member fixed to said crankcase cover, which extends vertically and includes a top and a bottom, which is adapted to contain oil, and which has therein a like plurality of formations fixed to said wall and respectively including therein vertically extending and aligned apertures, and recesses which respectively communicate with said apertures and face said wall, which are isolated from said oil supply chamber, and which respectively communicate with said pairs of first and second oil supply passages, an oil reservoir, an oil pump communicating with said bottom of said supply chamber to supply oil thereto, a vapor separator communicating with said top of said oil supply chamber to receive returning oil therefrom and including an oil holding tank having therein a float member, and an apportioning valve communicating with said oil reservoir, with said oil holding tank of said vapor separator, and with said oil pump, and including a valve member operatively connected to said float member and being moveable, in response to location of said float member above a given position, to a first position blocking oil flow from said oil reservoir to said oil pump and permitting oil flow from said oil holding tank to said oil pump, and being moveable, in response to location of said float member below a given position, to a second position blocking oil flow from said oil holding tank to said oil pump and permitting oil flow from said oil reservoir to said oil pump, a metering rod including a like plurality of aligned segments which are arranged in series, which respectively include therein grooves, and which are supported in said oil supply chamber for movement in said apertures in said formations between first positions wherein said grooves are located in said oil chamber, thereby affording filling of said grooves with oil, and second positions wherein said grooves are located in said formations in communication with said recesses, thereby affording supplying of the oil in said grooves to said sealed crankcase chambers, an electrical solenoid operative, when energized, to displace said metering rod in one direction between said first and second positions, and a spring operative, when said solenoid is deenergized, to displace said metering rod in the direction opposite to said one direction.

16. A two-stroke internal combustion engine comprising a first crankcase, a second crankcase, a pulse passage communicating between said first and second crankcases, an oil pump including an inlet and an outlet, an oil supply chamber spaced from said pulse passage, communicating between said oil pump outlet and said oil pump inlet for continuously receiving oil discharged from said oil pump outlet and for continuously returning excess oil to said oil pump inlet, a metering passage extending between said oil supply chamber and said pulse passage, a metering rod extending into said metering passage, including therein a recess, and being movable between an oil receiving position wherein said recess is in communication with said oil supply chamber, whereby a quantity of oil is received in said recess, and a delivery position wherein said recess communicates with said pulse passage, whereby the oil in said recess is delivered to said pulse passage, and means for displacing said metering rod between said receiving position and said delivery position.

17. A two-stroke internal combustion engine in accordance with claim 16 wherein said displacing means includes a spring biasing said metering rod in one direction toward one of said receiving position and said delivery position, and a solenoid for displacing said metering rod in the direction opposite to said one direction against the action of said spring and to the other of said receiving position and said delivery position.

18. A two-stroke internal combustion engine in accordance with claim 16 wherein said recess comprises a diametric hole in said metering rod.

19. A two-stroke internal combustion engine in accordance with claim 16 wherein said metering rod includes an outer surface and wherein said recess comprises an annular groove in said outer surface.

20. A two-stroke internal combustion engine in accordance with claim 16 wherein said metering rod extends transversely to said oil supply chamber.

21. A two-stroke internal combustion engine in accordance with claim 16 and further including an oil reservoir, a vapor separator communicating with said oil supply chamber to receive excess oil returning therefrom and including an oil holding tank having therein a float member, and an apportioning valve communicating with said oil reservoir, with said oil holding tank of said vapor separator, and with said oil pump, and including a valve member operatively connected to said float member and being moveable, in response to location of said float member above a given position, to a first position blocking oil flow from said oil reservoir to said oil pump and permitting oil flow from said oil holding tank to said oil pump, and being moveable, in response to location of said float member below a given position, to a second position blocking oil flow from said oil holding tank to said oil pump and permitting oil flow from said oil reservoir to said oil pump.

22. A lubricant supply system in accordance with claim 21 wherein said oil supply chamber extends vertically and includes a top and a bottom, wherein said vapor separator communicates with said top of said oil supply chamber, and wherein said oil pump communicates with said bottom of said oil supply chamber.

23. An internal combustion engine comprising a crankcase which supports a vertically extending crankshaft, and which defines a pair of adjacent sealed crankcase chambers defined, at least in part, by a crankcase cover including a vertically extending oil supply channel, a pair of bosses located in said oil supply channel in vertically spaced relation to each other and respectively including therein vertically aligned apertures, a pair of horizontally extending oil supply passages communicating with each other, communicating respectively with said pair of crankcases, and respectively intersecting said pair of apertures, a metering rod extending through said apertures in said bosses, being axially moveable between an oil accepting position and an oil delivery position, and including therein a pair of axially spaced annular grooves located in said oil supply channel when said metering rod is in said oil accepting position and respectively located in said oil supply passages when said metering rod is in said oil delivery position, means for displacing said metering rod between said accepting position and said delivery position and including a spring biasing said metering rod in one direction toward one of said accepting position and said delivery position, and a solenoid displacing said metering rod in the direction opposite to said one direction against the action of said spring and to the other of said accepting position and said delivery position in response to electrical actuation thereof, an oil sump, an oil pump including an inlet communicating with said oil sump, and an outlet communicating with said oil supply channel, and a conduit communicating with said oil supply channel and with said pump upstream of said inlet.

24. An internal combustion engine in accordance with claim 23 wherein said engine further includes a plurality of pairs of sealed crankcase chambers, a like plurality of pairs of said oil supply passages respectively communicating with said sealed crankcases chambers, a like plurality of said bosses respectively including a like plurality of said apertures which are in alignment with each other and which respectively communicate with said oil supply passages, and wherein said metering rod includes a like plurality of said pair of grooves which communicate with said oil supply channel when said metering rod is in said accepting position and which respectively communicate with said oil supply passages when said metering rod is in said oil delivery passage.

25. A lubricant supply system for a two-stroke internal combustion engine, said system including a pair of first and second adjacently located and substantially sealed crankcase chambers which alternately experience high and low pressure conditions which are out of phase with respect to the occurrence thereof, and an oil supply circuit including an oil supply passage including ends respectively communicating with said first and second crankcase chambers, an oil pump, an oil supply chamber adapted to contain oil, communicable with said oil pump for receipt of oil therefrom and communicable with said oil supply passage intermediate said ends for delivery of oil thereto so as to supply the oil to said first and second crankcase chambers, a member which includes an oil supply space and which is moveable independently of said pump and selectively and cyclically in and relative to said oil chamber and said oil supply passage between a first position wherein the first and second crankcase chambers are substantially sealed from each other, and a second position wherein said crankcase chambers are in communication with each other, and means for selectively effecting cyclical movement of said member between said first and second positions.

26. A lubricant supply system for a two-stroke internal combustion engine, said system including first and second adjacently located and substantially sealed crankcase chambers which alternately experience high and low pressure conditions which are out of phase with respect to the occurrence thereof, and an oil supply circuit including an oil supply passage including ends respectively communicating with said first and second crankcase chambers, an oil pump, an oil supply chamber adapted to contain oil, a member which includes an oil supply space and which is moveable independently of said pump and selectively and cyclically in and relative to said oil chamber and said oil supply passage between a first position wherein the first and second crankcase chambers are substantially sealed from each other and said oil supply space is located in said oil chamber, whereby said space is filled with a predetermined amount of oil, and a second position wherein said crankcase chambers are in communication with each other and said oil space is in communication with said oil supply passage so as to deliver the predetermined amount of oil to said supply passage during each cycle, and means for selectively effecting cyclical movement of said member between said first and second positions.

27. A lubrication supply system in accordance with claim 26 wherein said pair of crankcase chambers are formed in a crankcase cover which, at least in part, defines said oil supply chamber, wherein said oil supply passage includes a conduit system formed in an element located in said oil supply chamber, secured to said crankcase cover, and including an aperture having axially spaced first and second ends, wherein said system also includes means for sealing said element and said member when said member is in said second position and including a radius at one of said ends of said aperture, axially adjacent first and second counterbores at the other of said ends of said aperture, a chamfered surface on said member for sealing engagement with said radius when said member is in said second position, a sealing member located in said first counterbore in surrounding relation to said member, a washer located in said second counterbore in surrounding relation to said member and in axial engagement with said sealing member, a retainer on said member in spaced relation from said washer, and a spring located in surrounding relation to said member and bearing against said washer and said retainer so as to urge said member in the direction locating said member is said second position and so as to sealingly engage said radius and said chamfered surface and so as to sealingly engage said sealing member with said element and said member.

28. A lubrication supply system in accordance with claim 26 wherein said system comprises a plurality of said pairs of first and second crankcase chambers formed in a crankcase cover, a like plurality of oil supply passages formed in said crankcase cover, and a like plurality of said members are which located in said oil supply chamber and which are engaged in abutting end to end relation, and a like plurality of elements secured to said crankcase cover and respectively including apertures which are in axial alignment with one another and which respectively receive said members, and a conduit system which intersects said aperture and which is a part of an associated one of said oil supply passages.

29. A lubrication supply system in accordance with claim 28 wherein said means for effecting member movement includes a like plurality of springs respectively biasing said members to said second position, thereby locating said oil supply spaces in communication with the associated one of said conduit systems, and a solenoid operative to move one of said members so as to move all of said members against the action of said springs into said first position, thereby to locate said oil supply spaces in said oil chamber.

* * * * *